March 30, 1943. H. IVES ET AL 2,315,333

SKIN CLAMP

Filed Feb. 20, 1942

HAROLD IVES
PAUL W. BUERKLE
INVENTORS

BY J. Edwin Coates
ATTORNEY.

Patented Mar. 30, 1943

2,315,333

UNITED STATES PATENT OFFICE 2,315,333

SKIN CLAMP

Harold Ives, Tulsa, Okla., and Paul W. Buerkle, West Los Angeles, Calif.

Application February 20, 1942, Serial No. 431,670

13 Claims. (Cl. 85—5)

This invention relates to devices for temporarily securing together a plurality of perforated plate like elements in perforate alignment. Such devices are variously known in the art as temporary rivets, skin fasteners and skin clamps.

Skin clamps, or temporary rivets, are employed very extensively in the manufacture of airplanes, more than a half million of them being in use at a given time in a large modern aircraft factory. These devices are used to hold two or more sheets of airplane covering material, such as metal skin sheets, together or to attach one or more sheets of airplane covering material to the airplane framework temporarily, preparatory to the riveting operation. They are placed thru various rivet holes in the material, thus clamping the several elements securely together and maintaining rivet hole alignment. After the elements are riveted securely in other places, the skin clamps are removed and permanent rivets inserted in their place.

Most skin clamps now used in the industry are of such nature that they require the use of specially designed plier-like tools for their application. In many ways it is preferable to have a device which may be operated by the thumb and finger of the workman. The only hand-operated skin clamps prior to our invention so far as we know, have been relatively complicated, built of many parts, and expensive to manufacture. Because of the very large number of skin clamps in use at the present time, a simple and inexpensive device is particularly desirable.

Accordingly it is one object of the present invention to provide a skin clamp which is inexpensive and easy to manufacture in quantity.

Another object is to produce a skin clamp which has a minimum number of parts and is less likely to get out of order in ordinary use.

A further object is to produce a skin clamp which is readily operated and requires no special tools for application.

An additional object is to provide a skin clamp which is adaptable to a wide variety of thicknesses of material and which will securely grip the material even though used in rivet holes larger than those for which it is ordinarily intended.

Other and further objects and advantages will become apparent from a perusal of the following description.

In the accompanying drawing which illustrates the invention in various preferred embodiments:

Figure 1:
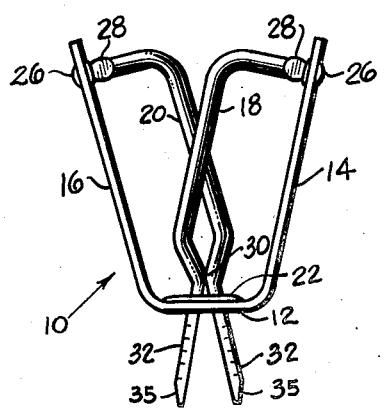
Figure 1 is a front elevational view of the preferred form of my invention.

Our improved clamp, as indicated in Figure 1, consists essentially of a body 10 made up of a base portion 12 and a pair of upstanding diverging legs 14, 16, and a pair of clamping pins 18, 20.

The body is made from thin, flat sheet or ribbon stock of resilient material, such as is used in the manufacture of clock springs. The base portion 12 is substantially flat so that it may engage the material to be clamped without marring the surface thereof. Legs 14 and 16 are bent up from base 12 with an included angle somewhat greater than 90 degrees.

Figure 5:
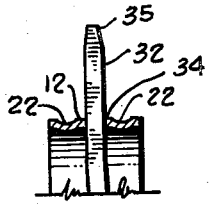
Figure 5 is a fragmentary sectional view taken along line 5—5 of Figure 4.

Stiffening ribs 22, shown in Figure 1 and more particularly detailed in Figure 5, are struck up in the base portion 12 and serve to prevent it from buckling under load. Because of the rigidity of the base thus obtained, the juncture of each of the legs 14 and 16 therewith becomes a virtual pivot about which the legs may swing. This is an important feature, as will be brought out hereinafter.

Pin members 18 and 20 are identical in construction and are formed of round spring wire. This wire is so strong in its finished form that it is substantially rigid as compared with the resilience of the body material. Pin 18 is attached at its upper end to leg 14 by passing the end of the wire thru a hole 24 formed in the leg and riveting the end of the pin over into a head 26, preventing its withdrawal. At the same time, the portion of the pin just inside the leg is flattened, as indicated at 28. As a result, the pin is rigidly held with respect to the leg. Pin 20 is secured to leg 16 in the same manner.

In the released condition of the clamp, as indicated in Figure 1, the pins 18 and 20 cross over each other at about their mid points to form a somewhat X-shaped construction. Their points of attachment to the legs are offset to opposite sides of a vertical plane of symmetry passing thru the legs. Below their point of crossing, the pins are bent back toward each other and come into contact at 30, where they are now in alignment in the plane of symmetry. The pins diverge from point 30 to their free ends 32, and their point of contact constitutes a fulcrum about which they may rock in the clamping operation. The inner or contacting portions of the pins are flattened so that the two pins cooperate to form a substantially circular projection for insertion thru the work to be clamped. The free ends 32 pass thru an opening 34 in the base 12, which may be circular but is preferably slightly elongated to allow a greater range of movement for the pins. The ends are slightly rounded or sharpened, as indicated at 35, for more ready insertion in the work. In the released condition, contact of the free ends 32 with the sides of opening 34 limits the spread of legs 14 and 16 so that the device can be originally assembled with an initial tension.

Figure 6:
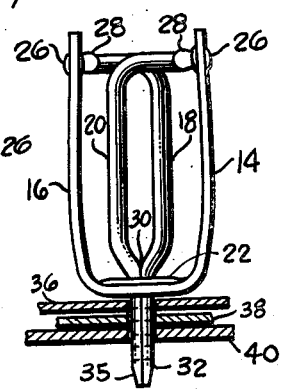
Figure 6 is a front elevation showing the skin clamp in compressed condition being inserted thru a plurality of plate-like elements.

In operation, the ends of legs 14 and 16 are gripped between the finger and thumb of one hand and compressed or squeezed toward each other. In this operation they become slightly bowed as indicated in Figure 6 but the principal movement is about their points of juncture with base 12, constituting virtual pivots. As a result of this compression, the upper and lower ends of the pins approach each other and, in addition, each pin moves about its respective virtual pivot so that it has a slight movement in a substantially axial direction along the axis of symmetry of the clamp.

Figure 7:
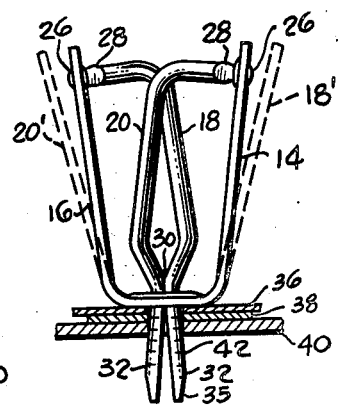
Figure 7 is a front elevation showing in full lines the clamp as it appears when holding a plurality of sheets or elements securely together, the dotted lines indicating the relative position of the legs in fully released condition.

The action of the clamp in securing perforated sheets together in perforate alignment is illustrated in two steps in Figures 6 and 7. In the first of these figures the clamp is shown fully compressed. In this condition, the pins have rocked or tilted about the fulcrum 30 so that the upper parts of the pins are substantially parallel and spaced and the lower parts of the pins have converged to a position in which they are substantially parallel and in contact from the fulcrum point to the tips, thus forming a substantially cylindrical projection. At the same time they are moved axially downward or extended a slight distance. Three sheets or plate-like elements 36, 38 and 40 are shown in substantially perforate alignment and the free ends 32 of the pins are passed therethru.

After the clamp has been compressed and the composite cylindrical projection inserted thru the perforations in the sheets, the clamp is released. At this time the free ends 32 simultaneously diverge and retract into the body of the clamp. In diverging, they firmly grip the edges of the holes in the sheets, and, in retracting, they pull the sheets tightly against the face of the base portion 12. The length of the free ends 32 makes the clamp adaptable to various thicknesses of material. The free ends can diverge sufficiently to engage holes of different diameters though they are normally designed for use only with a specified size of rivet hole. The sheets are thus held in accurate perforate alignment for the riveting operation. Dotted lines 18' and 20' indicate the relative position of the legs when released and not engaging any work, as in Figure 1. It will be seen, therefore, that there is a definite tension in the device when in use which prevents it from loosening at any time. To remove the clamp, it is only necessary to compress it until free ends 32 are again in contact and withdraw it.

Figure 2:
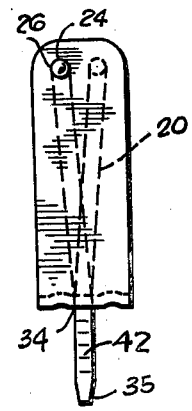
Figure 2 is a side elevation of the device.
Figure 3:
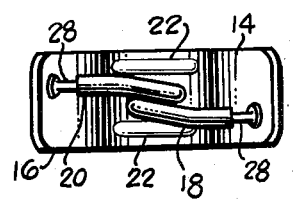
Figure 3 is a top plan view.
Figure 4:
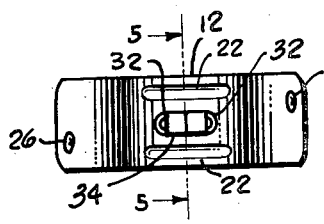
Figure 4 is a bottom plan view.

It will be noted by reference to Figure 2 that the outer surfaces of free ends 32 are roughened or provided with light circumferential score marks as indicated at 42. These score marks improve the engagement of the free ends with the holes in the work and eliminate any possibility of slippage.

Figure 8:
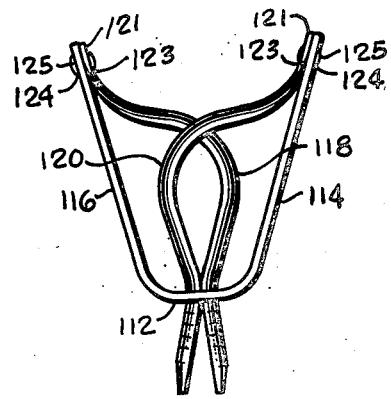
Figure 8 is a front elevational view showing an alternative form of the invention.

Figure 8 shows a modification of our invention which incorporates minor changes in design but is basically the same in construction and operation. Base 112, legs 114 and 116, and pins 118 and 120 substantially correspond to the equivalent parts in the preferred form. However pins 118 and 120 are made of half round wire thruout and are flattened at their upper ends 121. Holes 123 are drilled or punched therein and corresponding holes 124 are formed in the legs. Rivets 125 are used to secure the pins and legs together. The operation of this form is the same as that of the preferred form.

While our invention has been illustrated and described only in the form at present preferred by us, it is obvious that various additions and modifications may be made by those skilled in the art without departing from the spirit of the invention, and we aim to cover all such additions and modifications in the appended claims.

We claim:

1. In a skin clamp, a work-engaging member and a pair of clamping members carried thereby and having rocking contact with each other, said clamping members being mounted for movement therethru and thru the work to be clamped, the free ends of said clamping members being urged by said rocking contact to converge as they move axially outward thru said work-engaging member and to diverge as they return axially inward.

2. In a skin clamp, a U-shaped work-engaging member of resilient strip material and a pair of clamping members directly united thereto, and an opening in the base of said U-shaped member, said clamping members being arranged for movement thru said opening and thru the work to be clamped, the free ends of said clamping members being adapted to converge as they move axially outward thru said U-shaped member and to diverge as they return axially inward.

3. In a skin clamp, a U-shaped work-engaging member of resilient material provided with an opening in the base portion thereof, and a pair of clamping pins of substantially rigid material, each pin being riveted to the outer end of one of the legs of said U-shaped member, said pins crossing intermediate their lengths and their free ends extending thru said opening, compression of said legs causing said free ends to converge and move axially outward, and release of said legs allowing said free ends to diverge and move axially inward.

4. In a skin clamp for securing perforated plate-like elements in perforate alignment, a body member having a work-engaging base and a pair of legs, an opening in said base, a pair of clamping pins, one secured to each of said legs, the free ends of said pins extending thru said opening and being adapted to extend thru the perforations in said elements, said pins overlapping each other and being provided with fulcrums for interengagement, and being mounted for coextensive axial movement thru said opening, said interengagement causing the free ends of said pins to converge during extension and to diverge during retraction, to align the perforations in said elements and to clamp said elements securely against said base.

5. In a device for securing a plurality of perforated plates in perforate alignment, a body member, a pair of clamping members mounted for axial movement thru said body member and having interengaging portions forming a fulcrum therebetween, said clamping members rocking about said fulcrum during said axial movement to cause the free ends thereof to converge during extension and to diverge during retraction.

6. In a device for securing a plurality of perforated plate-like elements in perforate alignment, a base member, an opening formed therein, a pair of clamping members mounted for axial movement therethru and having interengaging portions constituting a fulcrum therebetween, and spring means urging the ends of said clamping members apart, compression of said spring means during extension causing the free ends of said clamping members to converge to allow them to enter the perforations in said plate-like elements.

7. In a device for securing a plurality of perforated plate-like elements in perforate alignment, a body member, a pair of clamping pins movable axially thru said body member for extension and retraction and interengaging means formed integral with said pins to cause their free ends to converge during extension and to diverge during retraction.

8. In a device for securing a plurality of perforated plate-like elements in perforate alignment, a U-shaped body member of resilient material comprising a pair of leg members and a base member connecting said leg members, said base member being provided with an opening therethru, a pair of pin members of relatively rigid material, each pin member being secured to the outer end of one of said leg members, said pin members crossing each other and their free ends passing thru said opening for extension and retraction, and means on an intermediate portion of at least one of said pin members interengaging the other pin member to form a fulcrum, whereby the free ends of said pin members will be caused to converge during extension and to diverge during retraction.

9. In a device for securing a plurality of perforated plate-like elements in perforate alignment, a body comprising a perforated, work-engaging base portion and a pair of diverging legs integral therewith, said body being formed of spring-like material so that the juncture of each leg with the base portion serves as a pivot, and a pair of pin members, each secured to the outer end of one of said legs, said pin members crossing over each other and passing thru the perforation in said base portion, the free ends of said pin members being adapted to converge and move out axially thru said base portion upon compression of said leg members and to diverge and retreat thru said base portion upon release of said legs, whereby said elements may be clamped securely between said divergent free ends and said base portion.

10. In a device of the class described, a body member formed of flat spring material, including a substantially flat base portion and a pair of legs extending upwardly from the ends of said base portion to form a U, said base portion being provided with an opening therethru. a pin member of rigid material secured to the free end of each of said legs, said pin members crossing each other in X-formation, said pin members having portions bent in toward each other to form a fulcrum, their free ends passing thru said opening and diverging from the fulcrum point, whereby compression of the free ends of said legs toward each other causes the free ends of said pin members to converge and move axially outward thru said opening.

11. The device as claimed in claim 10 wherein contact of the free ends of the pins with the sides of said opening limits their divergence and thereby the divergence of said legs, whereby initial tension may be provided.

12. The device as claimed in claim 10 wherein said base portion is provided with at least one reinforcing means to prevent buckling.

13. The device as claimed in claim 10 wherein the base portion is provided with a plurality of instruck reinforcing ribs.

HAROLD IVES.
PAUL W. BUERKLE.